(12) United States Patent
Obregon

(10) Patent No.: US 6,408,569 B1
(45) Date of Patent: Jun. 25, 2002

(54) PLANT SUPPORT ASSEMBLY

(76) Inventor: Raymond P. Obregon, 1800 N. 14th St., Bismarck, ND (US) 58501

( * ) Notice: Subject to any disclaimer, the term of this patent is extended or adjusted under 35 U.S.C. 154(b) by 0 days.

(21) Appl. No.: 09/401,559

(22) Filed: Sep. 22, 1999

(51) Int. Cl.[7] .......................... A01G 17/14; A01G 17/06
(52) U.S. Cl. ........................ 47/47; 47/42; 47/43; 47/44
(58) Field of Search ........................... 47/47, 4, 70, 83, 47/42, 43, 44; 52/165, 155; D8/1; 248/156, 11, 530; 119/786; 135/118; 175/327

(56) References Cited

U.S. PATENT DOCUMENTS

| | | | | |
|---|---|---|---|---|
| 3,739,523 A | * | 6/1973 | Tuffli .......................... 47/38.1 |
| 5,301,481 A | * | 4/1994 | Novak .......................... 52/165 |
| D412,816 S | * | 8/1999 | Thingvold ....................... D8/1 |
| 5,975,635 A | * | 11/1999 | Parpala ....................... 297/338 |

FOREIGN PATENT DOCUMENTS

GB      2220118 A   *   4/1990

* cited by examiner

Primary Examiner—Peter M. Poon
Assistant Examiner—Andrea M. Valenti

(57) ABSTRACT

A plant support assembly for rigidly supporting a plant in an upright position in various types of soil conditions. The inventive device includes a base, a tubular member attached to the base and extending upwardly, a shaft positionable within the base, and a locking strap for securing a plant to the shaft or tubular member. The shaft is preferably constructed of a material that is easily severed for allowing support for various heights of plants. The base is shaped for fitting within the lower portion of a conventional pot for plants. In an alternative embodiment, the tubular member includes an upper spiked end for inserting through the roots of the plant and thereafter receiving the adjusted shaft.

3 Claims, 3 Drawing Sheets

PLANT SUPPORT ASSEMBLY

BACKGROUND OF THE INVENTION

1. Field of the Invention

The present invention relates generally to plant support devices and more specifically it relates to a plant support assembly for rigidly supporting a plant in an upright position in various types of soil conditions.

Plants, especially newly planted plants, often times fall over in the loosely packed soil whether in a pot or directly into the ground surface. Often times stakes are inserted into the soil adjacent the plant, however the stake is inserted into the same loosely packed soil which sometimes fall over along with the plant because of wind or other forces.

The only effective method of retaining a plant in an upright position during the initial stages of growth is the use of stakes inserted a distance away from the plant with strings attached between the stakes and the plant. This is undesirable because the strings and stakes take up a significant amount of room and take a significant amount of time to install. Hence, there is a need for a stable plant support assembly that is easy to install and that does not take up a significant amount of room about the plant.

2. Description of the Prior Art

Plant support devices have been in use for years. Typically, a user utilizes a plurality of stakes inserted into the ground surrounding the plant with a corresponding plurality of strings attached between the stakes and the plant for supporting the plant from various positions.

Unfortunately, conventional methods of supporting plants are undesirable because of the significant amount of room they consume surrounding the plant. Conventional methods are also undesirable because of the significant amount of time required to install upon the plant.

Examples of plant support devices include U.S. Pat. No. 3,471,968 to L. R. Letz; U.S. Pat. No. 5,327,678 to Schweiker; U.S. Pat. No. 3,165,863 to J. Duran; U.S. Pat. No. 2,893,169 to I. L. Shepherd; U.S. Pat. No. 4,584,792 to Etzel; U.S. Pat. No. 4,509,289 to Fogelson; U.S. Pat. No. 3,148,480 to J. S. Gallo; U.S. Pat. No. 3,554,473 to Rakov & Grad; U.S. Pat. No. 5,501,038 to Gregoranto; U.S. Pat. No. 5,425,203 to Scott; U.S. Pat. No. 2,964,877 to F. A. Gaulding which are all illustrative of such prior art.

L. R. Letz (U.S. Pat. No. 3,471,968) discloses an adjustable telescoping plant support and watering device. Letz teaches a circular plate and a telescoping tube attached to the circular plate centrally for extending upwardly.

Schweiker (U.S. Pat. No. 5,327,678) discloses an extendable support post for potted plants. Schweiker teaches a vertical post secured to a horizontal apertured anchor plate.

Duran (U.S. Pat. No. 3,165,863) discloses a telescopic plant stake. Duran teaches a conical band, an outer tube attached within the conical band by a plurality of shafts, and an inner shaft within the outer tube.

While these devices may be suitable for the particular purpose to which they address, they are not as suitable for rigidly supporting a plant in an upright position in various types of soil conditions. Conventional plant support devices and systems require significant amount of time to install. In addition, conventional plant support devices and systems generally do not provide a stable support system for a plant during the initial stages of growth.

In these respects, the plant support assembly according to the present invention substantially departs from the conventional concepts and designs of the prior art, and in so doing provides an apparatus primarily developed for the purpose of rigidly supporting a plant in an upright position in various types of soil conditions.

SUMMARY OF THE INVENTION

In view of the foregoing disadvantages inherent in the known types of support devices now present in the prior art, the present invention provides a new plant support assembly construction wherein the same can be utilized for rigidly supporting a plant in an upright position in various types of soil conditions.

The general purpose of the present invention, which will be described subsequently in greater detail, is to provide a new plant support assembly that has many of the advantages of the support devices mentioned heretofore and many novel features that result in a new plant support assembly which is not anticipated, rendered obvious, suggested, or even implied by any of the prior art support devices, either alone or in any combination thereof.

To attain this, the present invention generally comprises a base, a tubular member attached to the base and extending upwardly, a shaft positionable within the base, and a locking strap for securing a plant to the shaft or tubular member. The shaft is preferably constructed of a material that is easily severed for allowing support for various heights of plants. The base is shaped for fitting within the lower portion of a conventional pot for plants. In an alternative embodiment, the tubular member includes an upper spiked end for inserting through the roots of the plant and thereafter receiving the adjusted shaft.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a plant support assembly that will overcome the shortcomings of the prior art devices.

Another object is to provide a plant support assembly that supports a plant in an upright position.

An additional object is to provide a plant support assembly that can be utilized in various types of soil conditions.

A further object is to provide a plant support assembly that is easy to install without requiring a significant amount of time for installation.

Another object is to provide a plant support assembly that is adjustable for various heights of plants.

A further object is to provide a plant support assembly that is positionable within a conventional pot for plants or directly into the ground.

Another object is to provide a plant support assembly that is stable even with loose soil conditions.

An additional object is to provide a plant support assembly that does not deteriorate or decay over extended periods of time.

Another object is to provide a plant support assembly that does not significantly alter the aesthetics of the plant.

A further object is to provide a plant support assembly that can be constructed out of biodegradable material.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
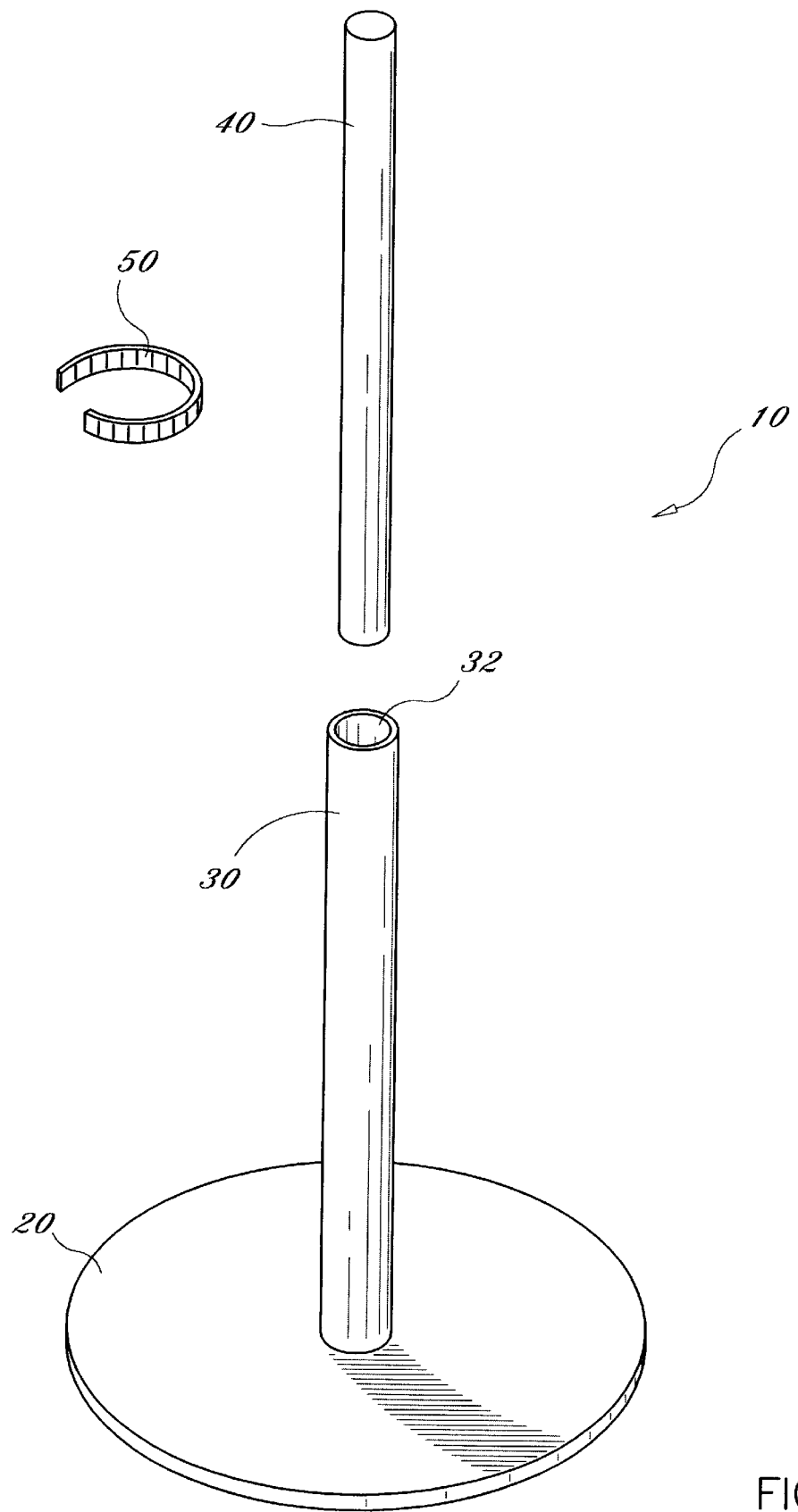
FIG. 1 is an upper perspective view of the present invention.
Figure 2:
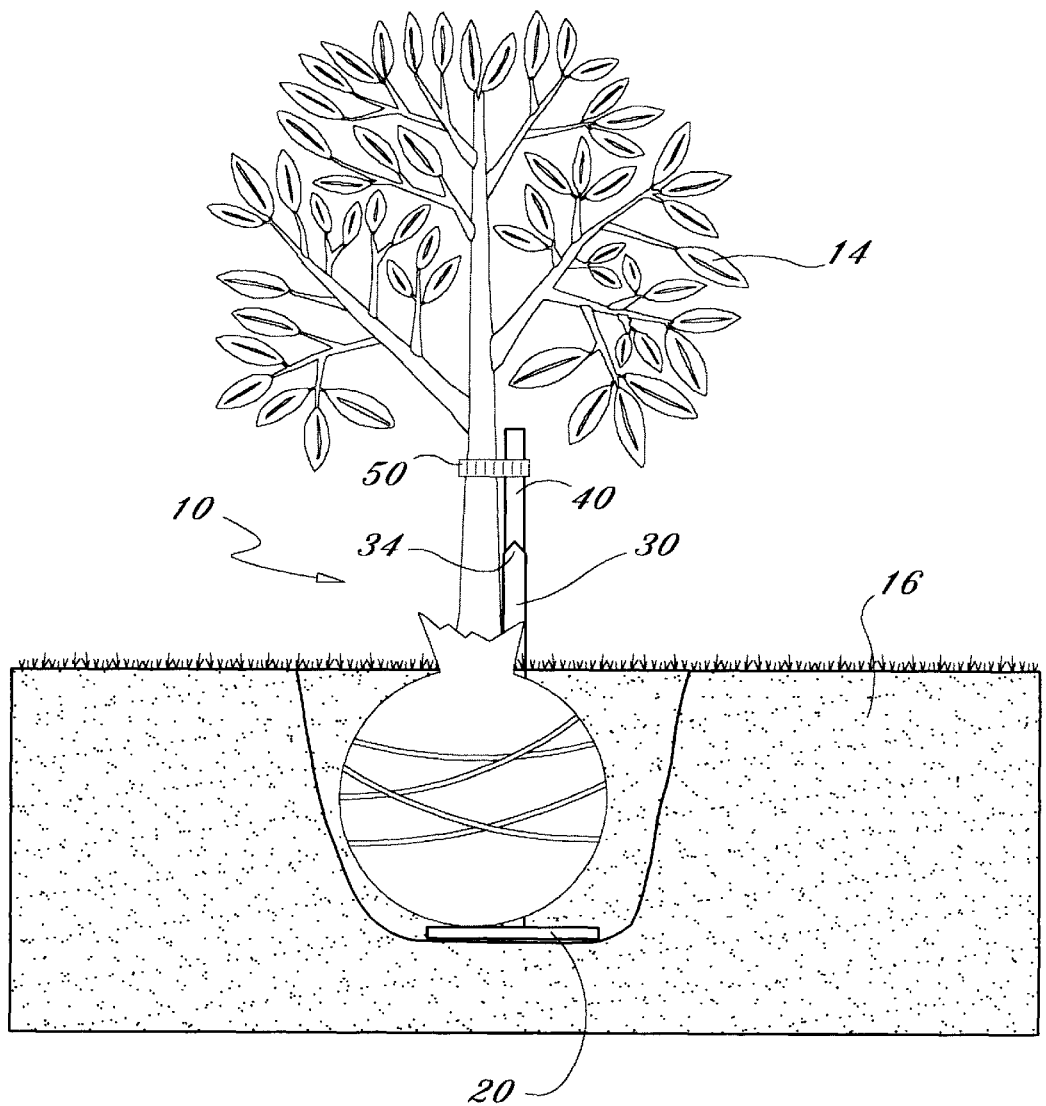
FIG. 2 is a side view of an alternative embodiment of the present invention showing a spiked end for the tubular member.
Figure 3:
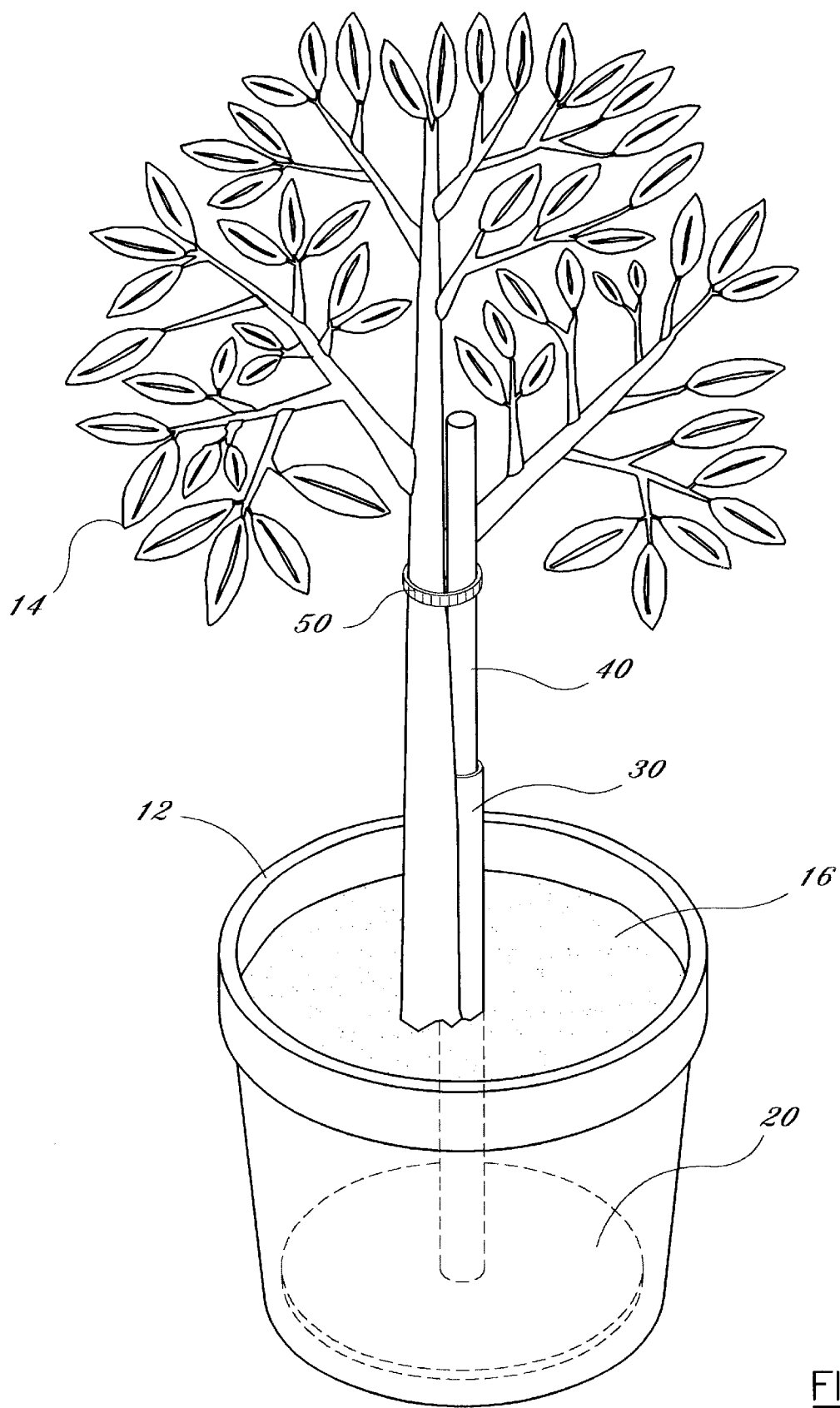
FIG. 3 is an upper perspective view of the present invention positioned within a pot and supporting a plant.

Turning now descriptively to the drawings, in which similar reference characters denote similar elements throughout the several view, FIGS. 1 through 3 illustrate a plant support assembly 10, which comprises a base 20, a tubular member 30 attached to the base 20 and extending upwardly, a shaft 40 positionable within the base 20, and a locking strap 50 for securing a plant 14 to the shaft 40 or tubular member 30. The shaft 40 is preferably constructed of a material that is easily severed for allowing support for various heights of plants 14. The base 20 is shaped for fitting within the lower portion of a conventional pot 12 for plants 14. In an alternative embodiment, the tubular member 30 includes an upper spiked end 34 for inserting through the roots of the plant 14 and thereafter receiving the adjusted shaft 40.

As best shown in FIG. 1 of the drawings, the base 20 is preferably constructed into a flat structure. The base 20 preferably has a circular shape for conforming to the shape and size of most pots 12, however it can be appreciated that various other shapes may be utilized. The weight of the soil 16 upon the base 20 prevents the base 20 from moving thereby maintaining the tubular member 30 and shaft 40 in a substantially vertical position during various weather conditions.

As further shown in FIG. 1 of the drawings, a tubular member 30 extends from the center portion of the base 20 extending upwardly there from. The tubular member 30 has a lumen 32 for receiving the shaft 40 as shown in FIG. 1 of the drawings. In the alternative embodiment shown in FIG. 2 of the drawings, the tubular member 30 has a spiked end 34 for inserting through the roots of the plant 14 and thereafter receiving the shaft 40.

As shown in FIGS. 1 through 3 of the drawings, an elongated shaft 40 is provided that is insertable into the lumen 32 of the tubular member 30. The elongated shaft 40 is constructed of a material that is easily severed for allowing easy adjustment of the length. The shaft 40 preferably has the same cross sectional shape as the tubular member 30 as shown in FIG. 1 of the drawings. A locking strap 50 or other well-known securing means is provided for securing the plant 14 to the shaft 40 or the tubular member 30.

In use, the user positions the base 20 with the tubular member 30 attached thereto into the pot 12 or a hole in the ground. The user then positions the plant 14 about and adjacent to the tubular member 30 with the roots preferably positioned around the tubular member 30 and above the base 20. The user then inserts soil 16 into the pot 12 or hole in the ground thereby providing a downward force upon the base 20. The user continues inserting soil 16 and packing the soil 16 until the soil 16 is at the desired level. The user then trims the shaft 40 to the desired length depending upon the height of the plant 14 and then inserts the shaft 40 into the tubular member 30. The user then utilizes a securing means such as a locking strap 50 to secure a portion of the plant 14 to the tubular member 30 and/or the shaft 40. If the invention is comprised of biodegradable material, the invention will decompose after the plant 14 has had adequate time to establish a sufficient root structure. If the invention is comprised of a non-degradable material such as plastic, only the shaft 40 is removed after a period of time with the plant 14 allowed to grow upwardly with the shaft 40 sliding upwardly along with the growth of the plant 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant support assembly, comprising:
   a base having a flat circular structure, wherein said base is positionable within a pot;
   a tubular member having a lower end and an upper end, wherein said lower end of said tubular member is concentrically attached to said base orthogonally;
   said upper end of said tubular member is a spiked end for inserting through the roots of a plant;
   a shaft member slidably positionable within said tubular member, wherein said shaft is constructed of a material that can be easily severed;
   wherein said tubular member and said shaft have a circular cross sectional area;

wherein said base, said tubular member and said shaft are constructed of a biodegradable material; and a locking strap for securing said plant to said shaft.

2. A method of utilizing said plant support assembly as described in claim 1, said method comprising the steps of:

(a) positioning said plant support assembly upon a floor of said pot so that a bottom surface of said base is juxtaposed and concentric to said floor;

(b) positioning a plant having a volume of roots and a main stem directly above said spiked end of said tubular member and with said main stem having a substantially parallel axis to said tubular member and with said main stem a finite distance from an axis of said tubular member;

(c) applying a downward force upon said plant thereby causing said spiked end of said tubular member to pierce and extend through said volume of roots, continuing said downward force until said volume of roots positioned upon an upper surface of said base;

(d) filling said pot with a desired volume of soil;

(e) positioning said shaft into said tubular member;

(f) trimming said shaft to a desired length sufficient to accommodate said plant; and (g) securing said main stem of said plant to said shaft with said locking strap.

3. A method of utilizing said plant support assembly as described in claim 1, said method comprising the steps of:

(a) digging a cavity into a ground surface;

(b) positioning said plant support assembly upon a floor of said cavity so that a bottom surface of said base is juxtaposed and concentric to said floor;

(c) positioning a plant having a volume of roots and a main stem directly above said spiked end of said tubular member and with said main stem having a substantially parallel axis to said tubular member and with said main stem a finite distance from an axis of said tubular member;

(d) applying a downward force upon said plant thereby causing said spiked end of said tubular member to pierce and extend through said volume of roots, continuing said downward force until said volume of roots positioned upon an upper surface of said base;

(e) filling said cavity with a desired volume of soil;

(f) positioning said shaft into said tubular member;

(g) trimming said shaft to a desired length sufficient to accommodate said plant; and (h) securing said main stem of said plant to said shaft with said locking strap.

* * * * *